United States Patent
Hall et al.

(10) Patent No.: US 9,684,370 B2
(45) Date of Patent: Jun. 20, 2017

(54) REDUCING CAMERA INTERFERENCE USING IMAGE ANALYSIS

(71) Applicant: Microsoft Technology Licensing, LLC, Redmond, WA (US)

(72) Inventors: Michael Anthony Hall, Bellevue, WA (US); Spencer Dean Perreault, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 220 days.

(21) Appl. No.: 14/272,386

(22) Filed: May 7, 2014

(65) Prior Publication Data

US 2015/0326799 A1    Nov. 12, 2015

(51) Int. Cl.
| | |
|---|---|
| *H04N 5/33* | (2006.01) |
| *G06F 3/01* | (2006.01) |
| *H04N 5/357* | (2011.01) |
| *H04N 5/232* | (2006.01) |
| *H04N 5/235* | (2006.01) |

(52) U.S. Cl.
CPC .......... *G06F 3/011* (2013.01); *H04N 5/2354* (2013.01); *H04N 5/23241* (2013.01); *H04N 5/33* (2013.01); *H04N 5/357* (2013.01)

(58) Field of Classification Search
CPC .. G06F 3/011; H04N 5/23241; H04N 5/2354; H04N 5/33; H04N 5/357
See application file for complete search history.

(56) References Cited

U.S. PATENT DOCUMENTS

| | | |
|---|---|---|
| 8,265,870 B1 | 9/2012 | Nguyen et al. |
| 2005/0002662 A1 | 1/2005 | Arpa et al. |
| 2008/0049012 A1 | 2/2008 | Bar-Joseph et al. |
| 2009/0135258 A1* | 5/2009 | Nozaki ................. G03B 17/48 348/207.99 |
| 2010/0141747 A1* | 6/2010 | Kubo ................. A61B 1/00009 348/68 |
| 2010/0321377 A1* | 12/2010 | Gay ........................ G06T 11/00 345/419 |
| 2011/0035199 A1 | 2/2011 | Kristofik et al. |
| 2011/0200258 A1* | 8/2011 | Suzuki ............... G06K 9/00798 382/199 |
| 2011/0293179 A1* | 12/2011 | Dikmen .................. G06T 5/008 382/167 |
| 2012/0039526 A1 | 2/2012 | Garaas et al. |
| 2012/0056982 A1* | 3/2012 | Katz .................... H04N 13/025 348/43 |
| 2012/0197600 A1 | 8/2012 | Bai et al. |
| 2015/0201181 A1* | 7/2015 | Moore ............... H04N 13/0239 348/47 |

* cited by examiner

*Primary Examiner* — Tat Chio
(74) *Attorney, Agent, or Firm* — Alleman Hall Creasman & Tuttle LLP

(57) ABSTRACT

Various embodiments relating to reducing camera interference are disclosed. In one embodiment, an infrared image of a scene may be received from a camera that emits infrared light. An interference condition likely to degrade infrared performance of one or more proximate infrared devices may be recognized. Responsive to recognizing the interference condition, an instruction to mitigate the interference condition may be output.

20 Claims, 8 Drawing Sheets

REDUCING CAMERA INTERFERENCE USING IMAGE ANALYSIS

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Various embodiments relating to reducing camera interference with one or more proximate infrared devices are disclosed. In one embodiment, an infrared image of a scene is received from a camera that emits infrared light. An interference condition likely to degrade infrared performance of one or more proximate infrared devices is recognized from the infrared image. Responsive to recognizing the interference condition, an instruction to mitigate the interference condition is output.

DETAILED DESCRIPTION

Infrared cameras may be used to provide infrared images and/or depth images that may be analyzed for various purposes. In one example, the images may be analyzed to identify and track a human target in an observed scene. Depth data may be analyzed to recognize skeletal position and/or orientation, facial identity, finger and/or hand orientation, or other attributes of an observed human. Unlike traditional visible light cameras that rely on ambient light and/or visible light flashes, depth cameras emit infrared light that may be reflected by physical features in a scene. Furthermore, depth cameras may have a wide field of view (FOV) and thus may emit infrared light over a correspondingly large FOV. Various environmental conditions associated with the placement of the camera may degrade performance of the camera. Furthermore, various interference conditions associated with the placement of the camera may degrade performance of nearby infrared devices (e.g., infrared receivers of televisions, cable set-top boxes, home audio/video receivers, game consoles, entertainment computers, the camera itself, etc.).

Both environmental and interference conditions may be caused by various factors including features of the physical environment and/or an operating state of the infrared camera. In some cases, the same factors may cause both types of conditions. This description relates to various approaches for recognizing these conditions based on analysis of images received from an infrared camera, and outputting instructions to mitigate the conditions. In this way, infrared performance of an infrared camera and proximately located infrared devices may be increased.

Figure 1:
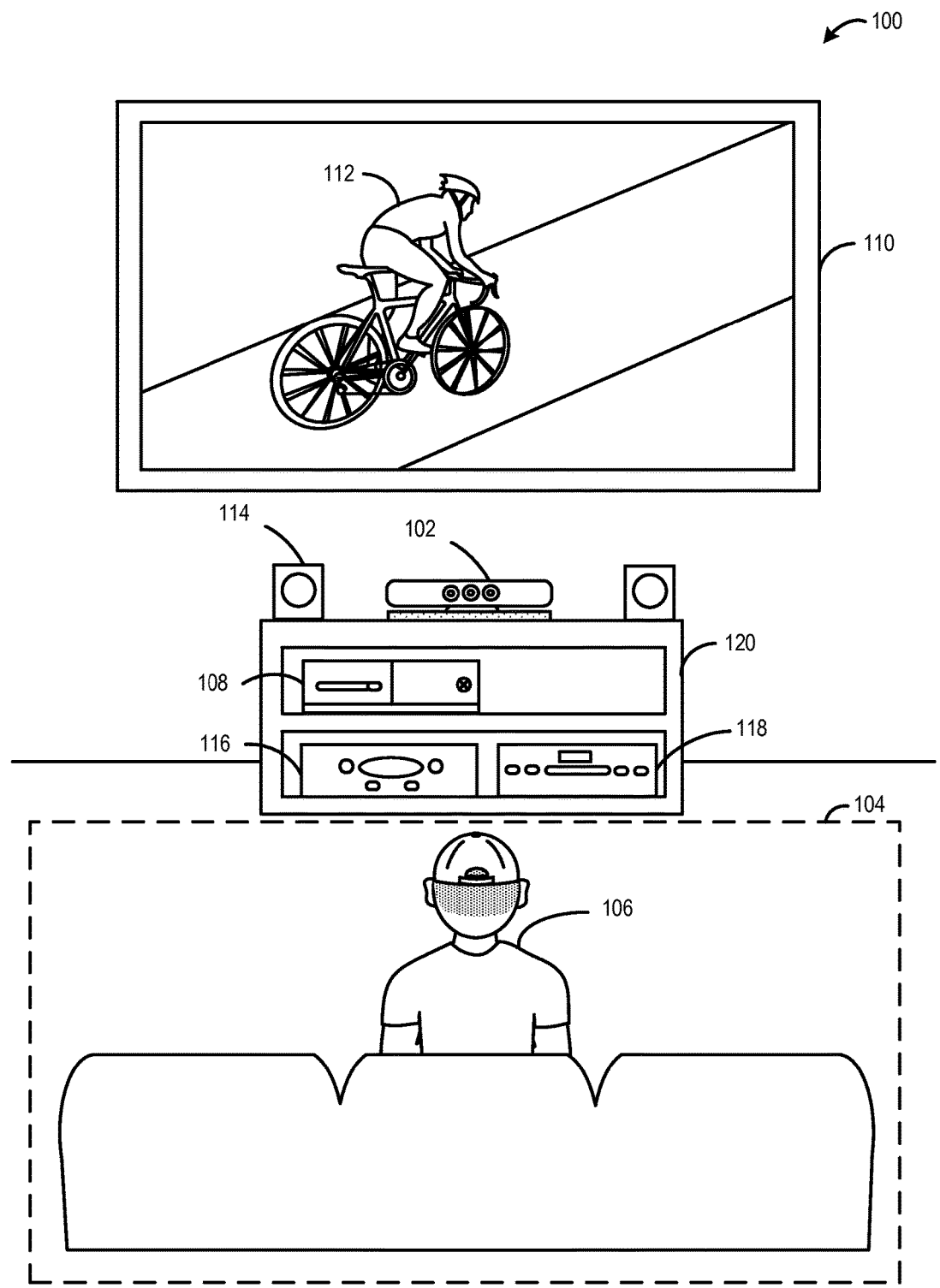
FIG. 1 shows an example entertainment environment in which an infrared camera is used to image a scene.

FIG. 1 shows an example of an entertainment environment 100 in which a camera 102 is imaging a scene 104 including a human target 106. The camera 102 is in communication with an entertainment computing device 108. The entertainment computing device 108 may be configured to present a variety of different types of digital content via a display 110. Non-limiting examples of digital content may include video games, movies, television shows, songs, and other types of media. Further, the entertainment computing device 108 may be configured to execute non-game applications and/or one or more operating systems.

The display 110 may be a television, a computer monitor, or another device configured to present visual content to the human target 106. The camera 102 may provide images to the entertainment computing device 108. In one example, the camera 102 may be a depth camera that emits depth sensing light that is reflected back from the human target 106 within the observed scene 104 to generate depth images. In one example, depth sensing light may include infrared light (e.g., emitted via an infrared laser). Although it will be understood that depth sensing light emitted by the camera may include any suitable wavelength of light from the electromagnetic spectrum. Further, the depth images may be analyzed by the entertainment computing device 108 to recognize the human target 106 and provide control corresponding to motion and/or other aspects of the human target.

In the illustrated implementation, the human target 106 is shown as a game player within the observed scene 104. Motion of the human target 106 may be interpreted by the entertainment computing device 108 as controls that can be used to affect a video game being executed by the entertainment computing device 108. In other words, the human target 106 may use his movements to control the video game. The movements of the human target 106 may be interpreted as virtually any type of game control.

The entertainment computing device 108 may be in communication with one or more audio speakers 114. The audio speakers 114 may present audio content to the human target 106. In some cases, the audio content may correspond with visual content presented via the display 110. For example, the audio speakers may present a sound track of a video game being presented on the display. In another example, the audio speakers may present audio content not related to a video game or visual content presented via the display.

The entertainment environment 100 may further include electronic devices other than the entertainment computing device 108. For example, the other electronic devices may provide content in addition to, or in conjunction with the entertainment computing device 108. For example, a cable television receiver 116 may be in communication with the display 110 and/or the entertainment computing device 108. In one example, the cable television receiver 116 may provide television content directly to the display 110. In another example, the entertainment computing device 108 may act as a pass-through and the cable television receiver 116 may provide television content to the entertainment computing device. Further, an audio/video (A/V) receiver 118 may be in communication with the display 110 and/or the entertainment computing device 108 to provide various content from various other component devices of the entertainment environment.

Often times, the electronic devices may be physically grouped together in the entertainment environment. In the illustrated example, all of the electronic devices are contained within an entertainment cabinet 120. As such, the electronic devices may be located proximate to the camera 102. As discussed above, some electronic devices may include infrared receivers that, under some conditions, may be interfered with by infrared light emitted by the camera 102. It will be understood that these electronic devices are merely examples, and any suitable electronic device that employs infrared technology or another light detecting technology may be implemented in the entertainment environment without departing from the scope of this disclosure.

When properly positioned and configured, images from the infrared camera may be used to model a human target. For example, a virtual skeleton that models the human target as a set of joint positions and/or orientations may be derived from one or more images.

In addition to being used to model the human target, images from the infrared camera may be analyzed to determine whether infrared performance of the infrared camera or other infrared devices proximate to the infrared camera is likely to be degraded. In other words, the entertainment computing device 108 may be configured to recognize an interference condition that is likely to degrade infrared performance of infrared devices proximate to the infrared camera including the infrared camera itself based on the images received from the camera 102. Likewise, the entertainment computing device 108 may be configured to recognize an environmental condition that is likely to degrade infrared performance of the infrared camera based on the images received from the camera 102.

These conditions may be recognized through a variety of different approaches. For purposes of brevity, approaches for recognizing an interference condition discussed herein may also be employed for recognizing an environmental condition. In other words, the same approaches may be used to recognize both conditions.

In one example, each pixel of an infrared image may be associated with a brightness value. Further, the interference condition may be recognized based on a greater-than threshold number of pixels of the infrared image having a brightness value greater than a threshold value. For example, if a large portion (e.g., >50%) of the image is above a brightness threshold, then it may be determined that conditions are not suitable for accurate infrared performance of the infrared devices. Further, too much infrared light may be reflected back to accurately track the human subject. Such a brightness level may indicate that there are too many reflective surfaces in the scene, to many nearby surfaces, and/or other potentially adverse conditions.

Figure 2:
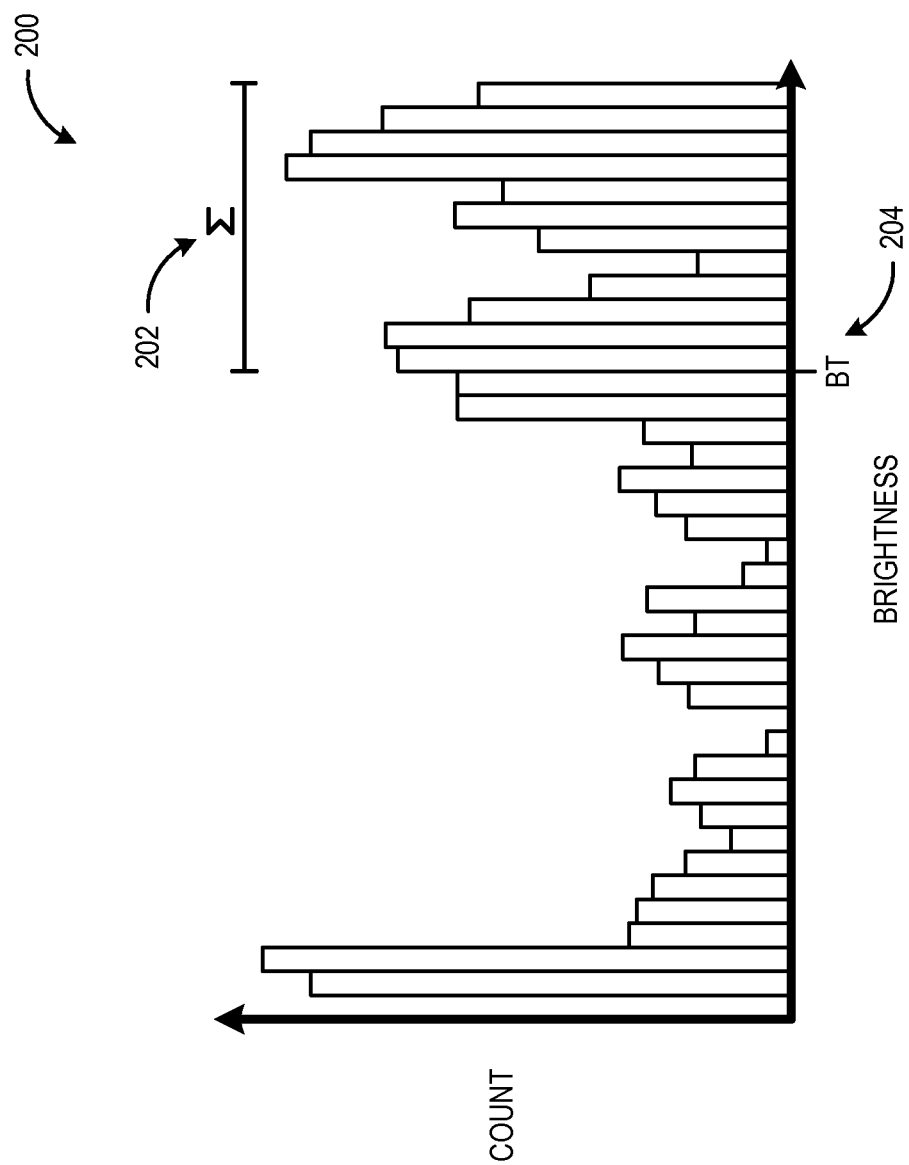
FIG. 2 shows an example histogram of pixel brightness of an image that may be used to recognize an interference condition.

In one example, the above described approach may be determined from a histogram of pixel brightness of an image. FIG. 2 shows an example of a histogram 200 of pixel brightness of an image. In particular, a number of pixels 202 having a brightness value greater than a brightness threshold 204 may be determined from the histogram. Further, it may be determined whether this number of pixels 202 is greater than a pixel-count threshold. If the number of pixels is greater than the pixel-count threshold, then it may be determined that there is an interference condition based on analysis of the image.

It will be understood that the histogram may be generated in any suitable manner. For example, the histogram may be provided by hardware in an image processing pipeline of a computing device. In another example, the histogram may be generated via software executed by a computing device. Moreover, histograms may be provided using any suitable parameters and in any suitable approaches for recognizing an interference condition, including the approaches described herein.

In another example, the interference condition may be recognized based on an average brightness of the infrared image being greater than a threshold brightness. For example, the average brightness may be determined by determining an average brightness value of all pixels in the infrared image of the scene.

In another example, the interference condition may be recognized based on a total intensity of light in the scene. The total light intensity may be estimated according to image data from the infrared camera. For example, the total light intensity may be represented by a single scalar indicating the light intensity for a pixel or group of pixels integrated over a designated time interval. In another example, the total light intensity may be represented by a scalar integrated across all pixels of a scene in an image. In either case, the interference condition may be recognized based on the total light intensity being greater than a light intensity threshold.

In another example, each pixel of the infrared image may be associated with a depth value as part of a depth map or depth image. Further, the interference condition may be recognized based on a greater-than threshold number of pixels of the infrared image having a depth value less than a threshold depth value. For example, if a large portion of the image is very shallow (e.g., <250 mm), then it may be determined that an object is at least partially blocking a FOV of the depth camera.

In another example, a scalar that represents a more generalized weighted average of depth in the scene may be generated. The interference condition may be recognized based on the scalar being greater than a threshold value.

In another example, the interference condition may be based on a scalar representative of a function of depth and brightness or intensity of the infrared image being greater than a threshold value. In one particular example, a weighting function may count pixels that have a depth value less than two-hundred fifty millimeters (or some other depth or weighted combination of depths) only when the infrared light intensity of an image exceeds a threshold light or a function of light intensity. Such a weighting function may be particularly applicable for certain camera designs or complex physical environments.

In some implementations, brightness and depth may be detected using the same sensor array of a camera. In other implementations, depth may be detected using a sensor array and brightness may be detected using a separate photodetector. This implementation may be useful in cameras that detect depth images separate from visible light images using different technologies.

It will be understood that any suitable threshold may be used to recognize the interference condition. In some implementations, design of the infrared camera may be calibrated by acquiring a large number of depth, infrared images, and/or integrated infrared receiver measurements over a wide variety of user environments. The images may be used to perform a global fit to optimize the thresholds of the different approaches described above in order to achieve adequate separation of good and poor camera placement. Further, such calibration may determine weighting constants, polynomial equations, and/or relationships used to generate an aggregate measurement or representative scalar as described above.

In some implementations, the interference condition recognition procedure may be performed in real-time every time a depth frame and/or infrared image is captured (e.g., 60/30/15 fps) or during a subset of all frames. In some implementations, the recognition procedure may be performed using some combination of frames (e.g., averaging over several frames). In some implementations, the procedure may be triggered by specific events, such as new objects being detected in a scene, one or more objects being moved closer to the camera, or responsive to detection of a change in placement of the infrared camera. For example, a change in placement may be detected from an accelerometer located on-board the infrared camera. In another example, a change in placement may be detected based on a comparison of images showing a change in reference points in an observed scene.

Upon recognizing the interference condition (or the environmental condition), the entertainment computing device 108 may be configured to output one or more mitigation instructions to mitigate the interference condition. Such mitigation instructions may include automatic instructions and/or manual instructions.

Automatic instructions may be instructions provided to the infrared camera (or performed by the computing device) to automatically mitigate the condition without user intervention. For example, an automatic instruction may include adjusting a parameter or an operating state of the infrared camera. More particularly, in one example, a mitigation instruction may include adjusting an infrared laser power of infrared light emitted by the camera. For example, the laser power may be lowered in order to not wash out infrared signals from remote control devices associated with other proximate infrared devices.

In another example, a mitigation instruction may include adjusting an illumination wave form of infrared light emitted by the camera. For example, a duty cycle of the infrared laser may be adjusted to distinguish the infrared signals of the other infrared devices and reduce infrared interference by the infrared camera.

In another example, a mitigation instruction may include adjusting a frame rate of infrared images captured by the camera. For example, the frame rate may be reduced (e.g., 30 to 15 fps) so that the likelihood of interfering with other infrared signals may be reduced.

In another example, a mitigation instruction may include adjusting an illumination profile of infrared light emitted by the camera. For example, an infrared laser may be aimed in a different direction, angle, orientation, etc. to avoid a highly reflective object or surface in the scene or to avoid an occlusion of the FOV of the infrared camera.

In another example, where the infrared camera is a depth camera configured to switch between operation in a time-of-flight depth mode and a structured-light depth mode, the mitigation instruction may include switching an operating mode of the camera between the time-of-flight depth mode and the structured light depth mode. For example, differently sized physical environments may have different modulation sequences that may be more compatible with one operating mode or the other. As such, operation of the camera may be switched between the different operating modes to determine the mode that produces the least amount of infrared interference.

Manual instructions may include notifications, instructions, or other prompts presented to the human target (or another user) so that the human target can manually mitigate the interference condition. In one example, the manual instructions may instruct the human target to change a placement of the camera in the physical environment. In another example, the manual instructions may instruct the human target to move an object (e.g., a highly reflective object) in the physical environment to mitigate the interference condition.

FIGS. 3-6 show various examples of mitigation instructions that may be provided by the entertainment computing device responsive to recognizing an interference condition. In particular, the entertainment computing device 108 may be configured to output one or more mitigation instructions to the display 110 and/or the audio speakers 114.

Figure 3:
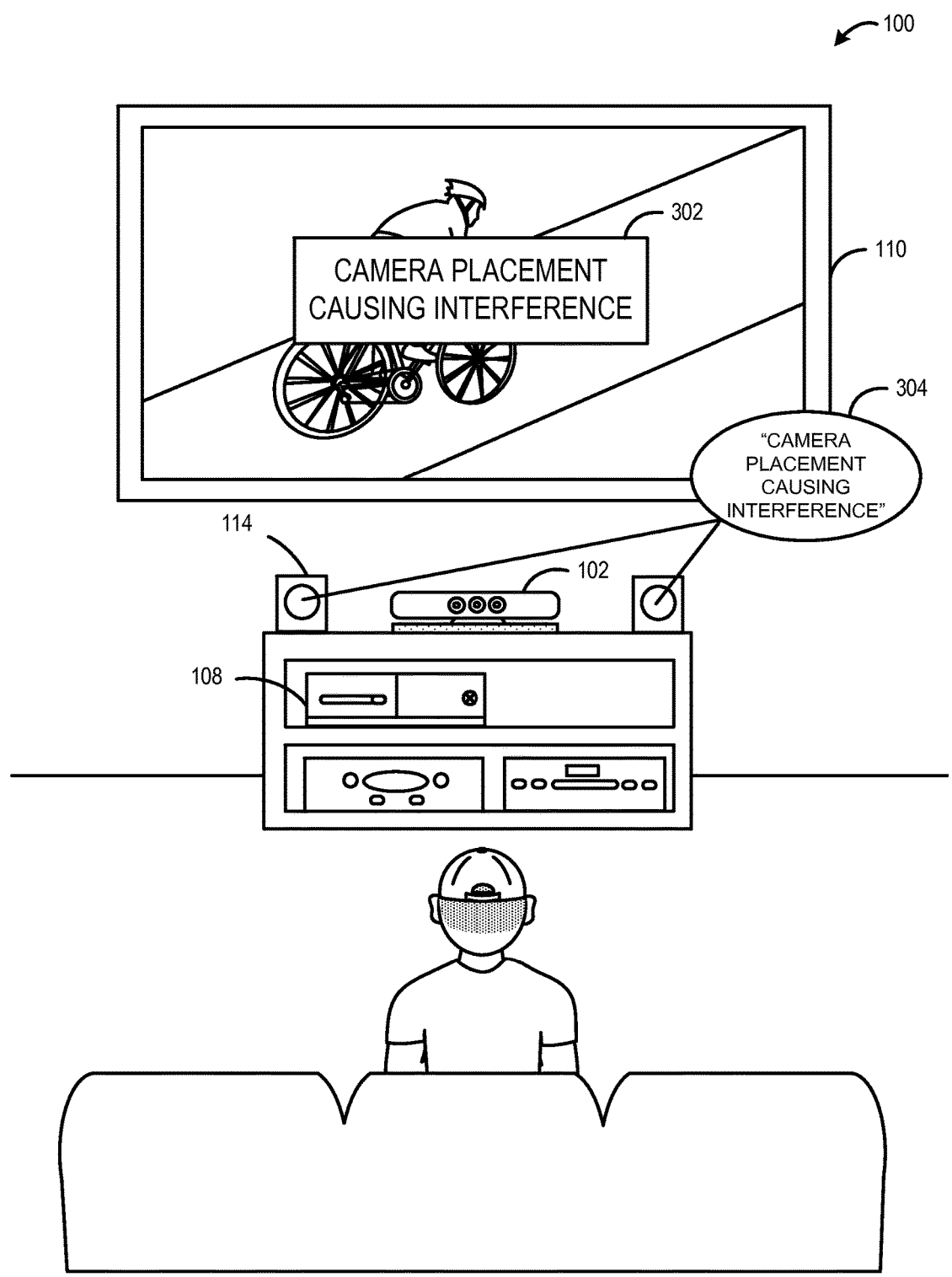
FIG. 3 shows example audio and visual notifications that may be presented to indicate that placement of a camera may be causing an interference condition.

In the example scenario shown in FIG. 3, the mitigation instructions may control the display 110 to present a visual notification 302 indicating that placement of the camera 102 is causing the interference condition. In some implementations, the visual notification 302 may be briefly presented via the display 110. In some implementations, the notification may be a graphical icon presented via the display 110 (e.g., presented in a corner of the display). In some implementations, the visual notification 302 may be persistently presented via the display 110 until the interference condition is mitigated. Furthermore, the mitigation instructions may control the audio speakers 114 to present an audio notification 304 indicating that placement of the camera 102 is causing the interference condition. It will be understood that the visual notifications may be presented alone or in combination with the audio notifications and vice versa. In some implementations, the notification may be provided via another feedback response, such as a haptic notification (e.g., a rumble) from a controller or other input device.

Figure 4:
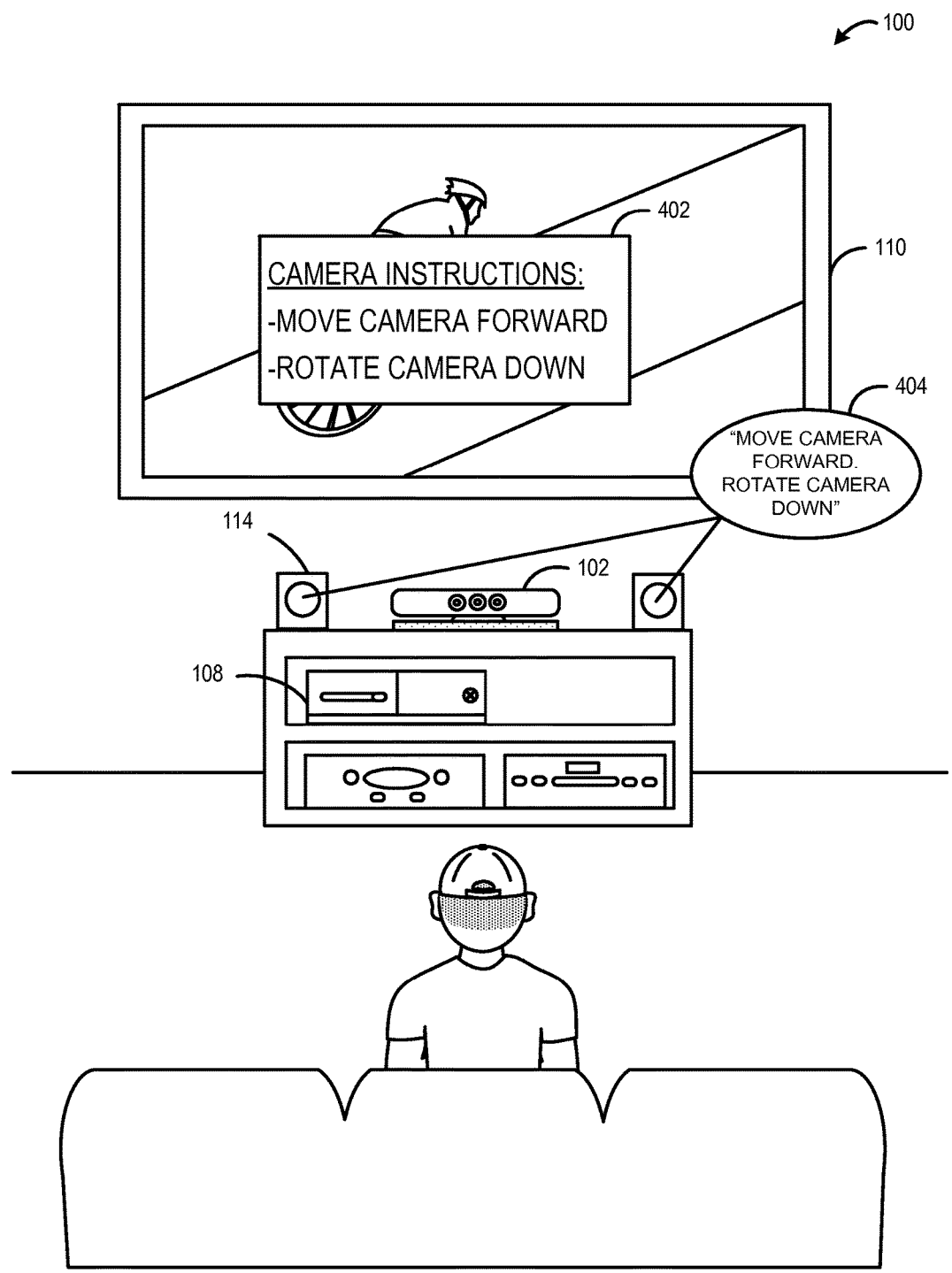
FIG. 4 shows example audio and visual prompts that may be presented to instruct how to adjust placement of a camera to mitigate an interference condition.

In the example scenario shown in FIG. 4, the mitigation instructions may control the display 110 to present visual prompts 402 that instruct the human target how to adjust placement of the camera or an object in the scene to mitigate the interference condition. For example, the prompts may include step-by-step instructions. In some cases, the prompts may include repeated feedback responsive to adjustment of placement of the camera until a desired placement is achieved. Furthermore, the mitigation instructions may control the audio speakers 114 to present audio prompts 404.

Figure 5:
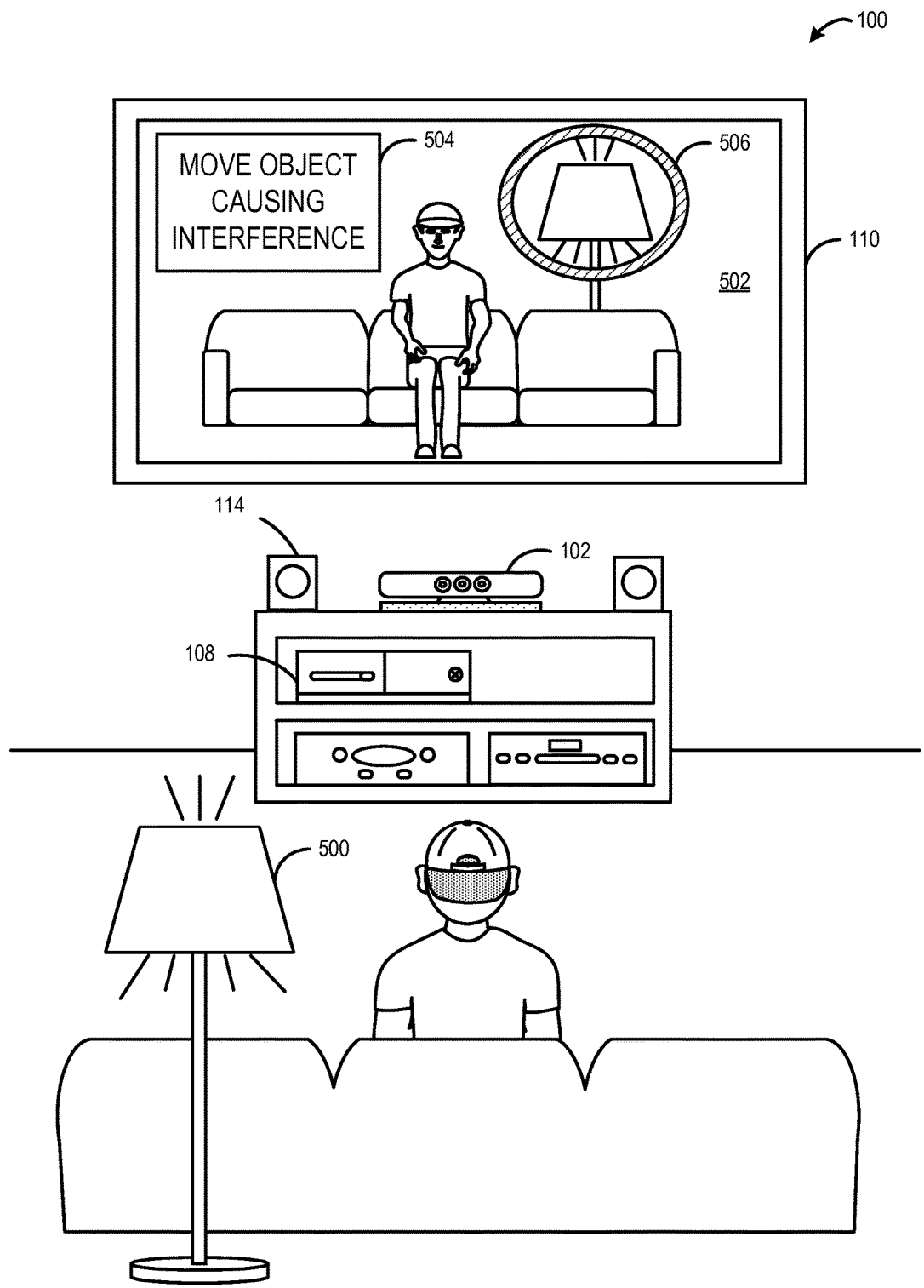
FIG. 5 shows an example instruction to mitigate an interference condition by moving an object determined to be causing the interference condition.

In the example scenario shown in FIG. 5, the interference may be caused by light reflected from a lamp 500 positioned in the observed scene. Accordingly, the mitigation instructions may control the display 110 to present an image 502 of the observed scene including the specific objects (e.g., the lamp) in the scene determined to be causing the interference condition. For example, the image may be derived from a depth image, an infrared image, an RGB image, or another type of image provided by the camera. It will be understood that the image 502 may be derived from any type of image provided by the camera 102.

Furthermore, the image 502 may include identification 506 (e.g., highlighting) of the offending object(s). For example, the highlighting may be via an overlay using a different color, shape, pattern, etc. In some implementations, an outline of edges of the object may be highlighted. In some implementations, the highlighting may include arrows or other indicators, or may have the name of an object written in text.

Moreover, the mitigation instructions may control the display to present instructions 504 instructing the human subject to move the offending object out of the observed scene, adjust the camera, or otherwise change the physical environment to mitigate the interference condition.

Figure 6:
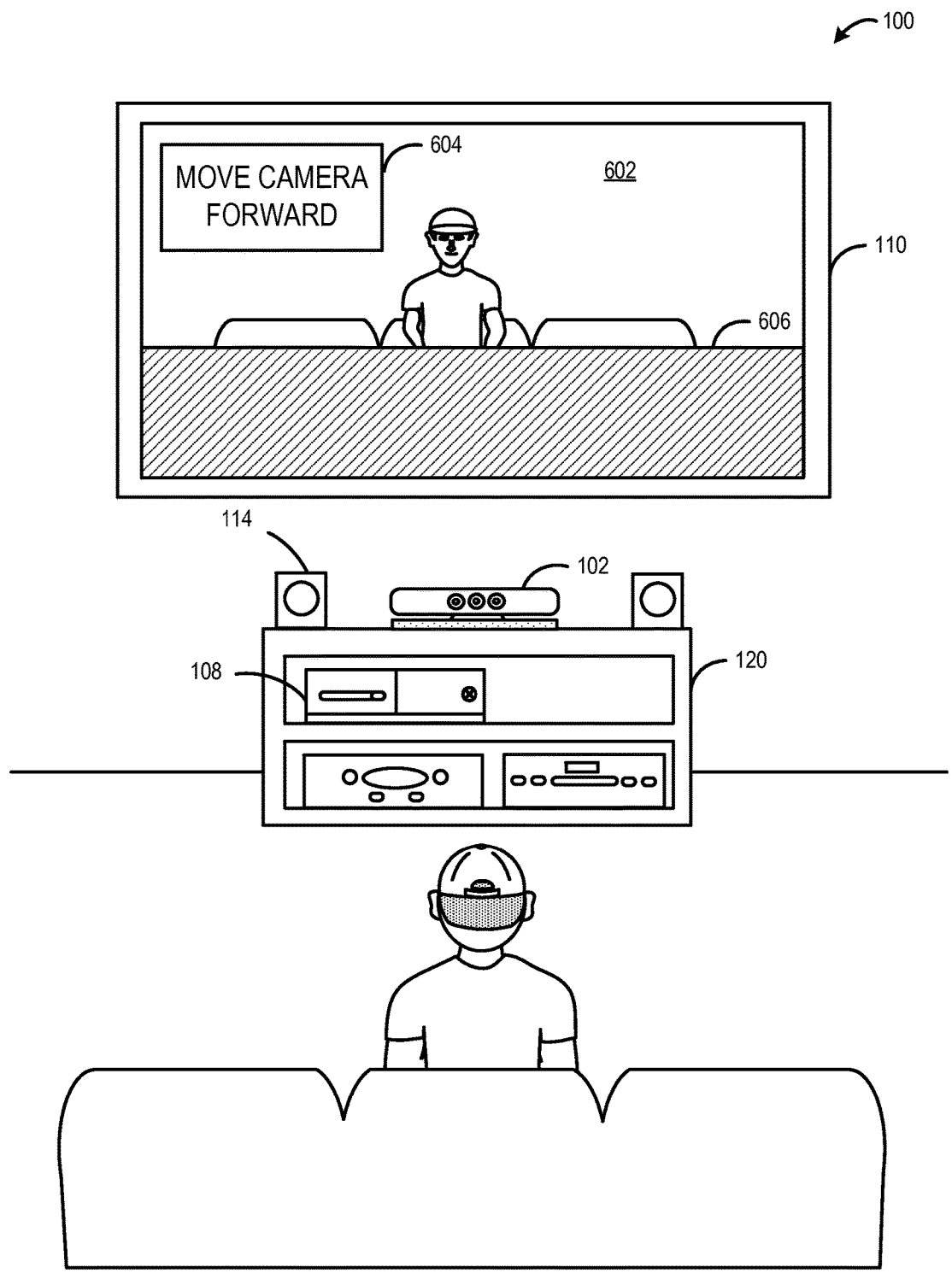
FIG. 6 shows an example instruction to mitigate an interference condition by moving a camera to avoid an object determined to be causing the interference condition.

In the example scenario shown in FIG. 6, the interference may be caused by an object occluding a FOV of the camera 102. As shown, the camera 102 may be placed too far back from an edge of an entertainment cabinet, such that infrared light emitted from the camera is reflected off the surface of the cabinet and back to the camera. Accordingly, the mitigation instructions may control the display 110 to present an image 602 of the observed scene including the specific objects (e.g., the surface of the cabinet) in the scene determined to be occluding the FOV of the camera and causing the interference condition.

Furthermore, the image 602 may include indication 606 (e.g., highlighting) of the offending object(s). For example, the highlighting may be via an overlay using a different color, shape, pattern, etc. In some implementations, an outline of edges of the object may be highlighted. In some implementations, the highlighting may include arrows or other indicators, or may have the name of an object written in text.

Moreover, the mitigation instructions may control the display to present instructions 604 instructing the human subject to adjust the placement of the camera 102 such that the FOV is not occluded by the object to mitigate the interference condition.

It will be understood that placement of the camera, layout of the physical environment, and/or objects in the physical environment may contribute to the interference condition (and/or the environmental condition). Additional non-limiting examples of scenarios that cause the interference condition may include highly reflective objects being placed in the scene (e.g., windows, mirrors, paintings, etc.), the human subject being positioned too close to the camera to allow for suitable reflection of infrared light, the camera being pointed directly at another infrared device, and the camera being placed next to another infrared device in an enclosed entertainment center (e.g., having glass cabinet doors) such that infrared light may reflect off the enclosure to interfere with infrared performance of the infrared device.

Figure 7:
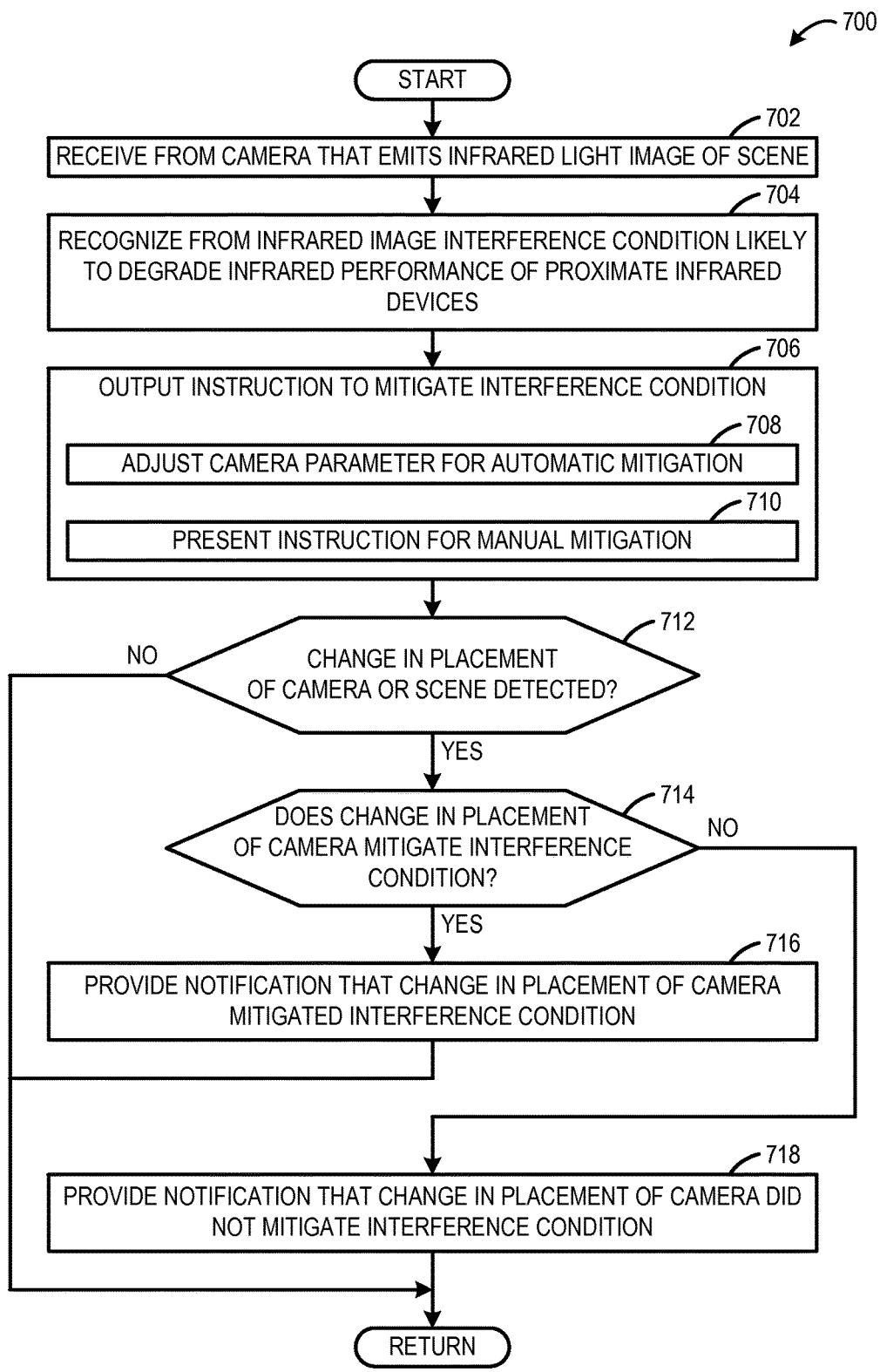
FIG. 7 shows a flow chart of an example method for reducing camera interference.

FIG. 7 shows a flow chart of an example method 700 for reducing camera interference. For example, the method 700 may be performed to recognize and mitigate an interference condition that is likely to degrade infrared performance of other infrared devices proximate to an infrared camera. Likewise, the method 700 may be performed to recognize and mitigate an environmental condition that is likely to degrade infrared performance of an infrared camera. The method 700 may be performed by any suitable computing device (e.g., the entertainment computing device 108 shown in FIG. 1).

At 702, the method 700 may include receiving from a camera that emits infrared light an infrared image of a scene. For example, each pixel of the infrared image may have an associated brightness value or light intensity value. In some implementations, the camera may be a depth camera and each pixel of the infrared image may be associated with a depth value. At 704, the method 700 may include recognizing from the infrared image an interference condition likely to degrade infrared performance of the one or more proximate infrared devices. It will be understood that the interference condition may be recognized according to any suitable approach as discussed above.

At 706, the method 700 may include outputting an instruction to mitigate the interference condition. In some implementations, at 708, the method 700 may include adjusting a parameter or operating state of the camera for automatic mitigation of the interference condition without intervention by a human subject. In some implementations, at 710, the method 700 may include presenting an instruction or other notification to a human subject for manual mitigation of the interference condition by the human subject. For example, the notification may instruct the human subject to change a placement of the camera and/or change an arrangement of an observed scene to mitigate the interference condition.

In implementations where a manual mitigation instruction is presented to the human subject, at 712, the method 700 may include determining whether a change in placement of the camera is detected or a change in the observed scene is detected. In one example, a change in placement of the camera may be detected based on a signal from an accelerometer or other position sensing device included in the camera. In one example, a change in the observed scene may be detected via a comparison of images before and after presentation of the manual mitigation instruction. If the change in placement of the camera or the change in the observed scene is detected, then the method 700 moves to 714. Otherwise the method returns to other operations.

At 714, the method 700 may include determining whether the change in placement of the camera or the change in the observed scene mitigated the interference condition. If the change mitigated the interference condition, then the method 700 moves to 716. Otherwise, the method 700 moves to 718.

At 716, the method 700 may include providing a notification indicating that the change mitigated the interference condition. In other words, the notification may provide feedback to the human subject indicating that his manual actions mitigated the interference condition and infrared performance of the infrared devices are no longer degraded by the infrared camera.

At 718, the method 700 may include providing a notification indicating that the change did not mitigate the interference condition. In other words, the notification may provide feedback to the human subject indicating that his manual actions did not mitigate the interference condition and additional changes to the camera position and/or objects in the observed scene may be needed to mitigate the interference condition. Accordingly, method 700 may optionally return to 706 after or instead of providing the notification at 718.

By performing the above described method, suitable placement of the camera so as not to degrade infrared performance of the camera and other proximate infrared devices may be achieved. In this way, problems derived from degradation of infrared performance due to camera placement may be avoided so that a human subject does not unknowingly blame such degradation on the quality of the camera.

The methods and processes described herein may be tied to a computing system of one or more computing devices. In particular, such methods and processes may be implemented as a computer-application program or service, an application-programming interface (API), a library, and/or other computer-program product.

Figure 8:
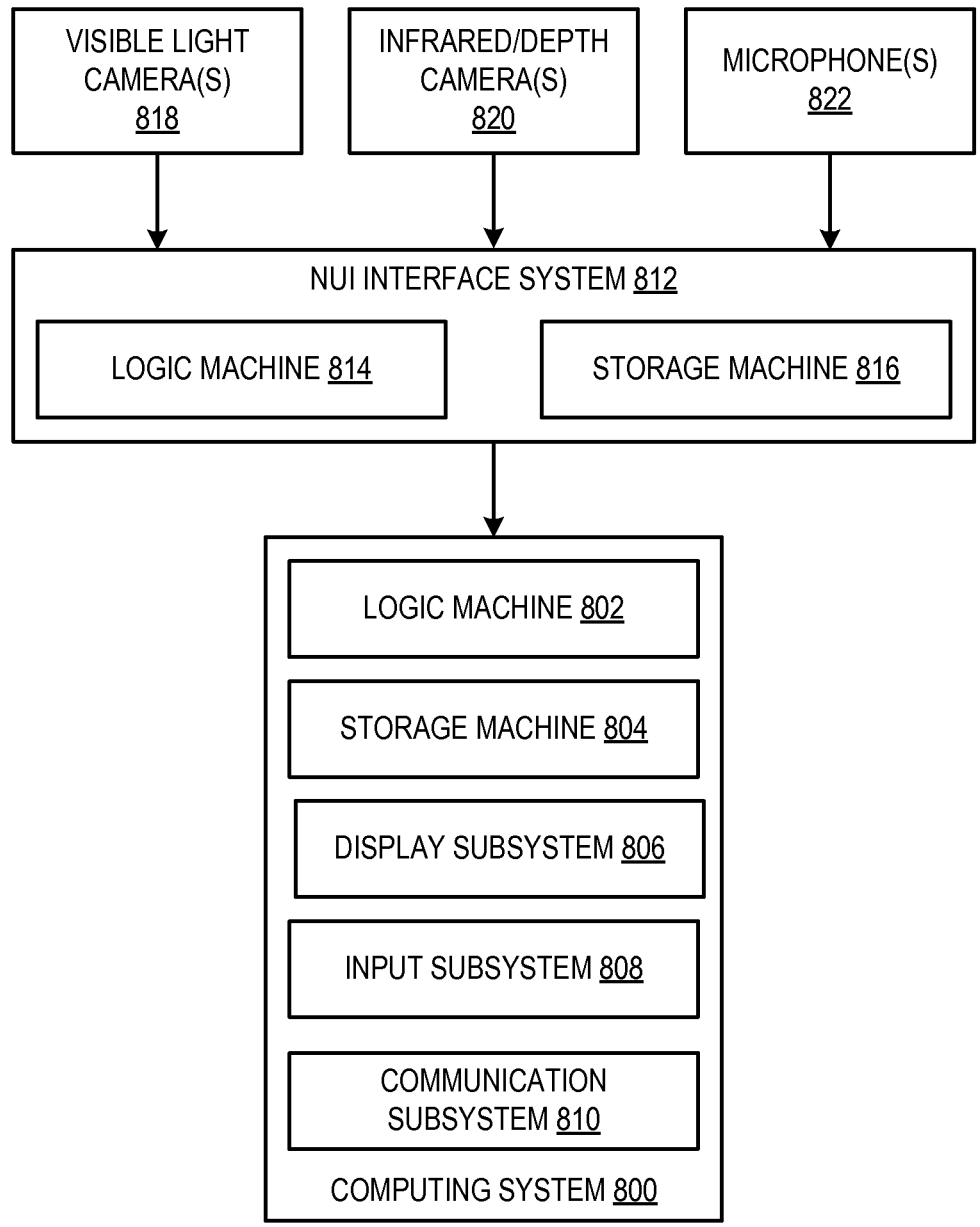
FIG. 8 shows an example computing system configured to mitigate camera interference.

FIG. 8 schematically shows a non-limiting embodiment of a computing system 800 that can enact one or more of the methods and processes described above. Computing system 800 is shown in simplified form. Computing system 800 may take the form of one or more personal computers, server computers, tablet computers, home-entertainment computers, network computing devices, gaming devices, mobile computing devices, mobile communication devices (e.g., smart phone), and/or other computing devices.

Computing system 800 includes a logic machine 802 and a storage machine 804. Computing system 800 may optionally include a display subsystem 806, input subsystem 808, communication subsystem 810, and/or other components not shown in FIG. 8.

Logic machine 802 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 804 includes one or more physical devices configured to hold instructions executable by the logic machine to implement the methods and processes described herein. When such methods and processes are implemented, the state of storage machine 804 may be transformed—e.g., to hold different data.

Storage machine 804 may include removable and/or built-in devices. Storage machine 804 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 804 may include volatile, nonvolatile, dynamic, static, read/write, read-only, random-access, sequential-access, location-addressable, file-addressable, and/or content-addressable devices.

It will be appreciated that storage machine 804 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 802 and storage machine 804 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

When included, display subsystem 806 may be used to present a visual representation of data held by storage machine 804. This visual representation may take the form of a graphical user interface (GUI). As the herein described methods and processes change the data held by the storage machine, and thus transform the state of the storage machine, the state of display subsystem 806 may likewise be transformed to visually represent changes in the underlying data. Display subsystem 806 may include one or more display devices utilizing virtually any type of technology. Such display devices may be combined with logic machine 802 and/or storage machine 804 in a shared enclosure, or such display devices may be peripheral display devices. In one example, the display subsystem 806 may be representative of the display 110 shown in FIG. 1.

When included, input subsystem 808 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

As noted above with reference to FIG. 1, the camera 102 may be configured to provide images representative of user input to the computing device 108. To this end, the camera 102 may be representative of an NUI interface system 812. The NUI interface system 812 includes a logic machine 814 and a storage machine 816. To detect the user input, the NUI interface system receives low-level input (i.e., signals) from an array of sensory components, which may include one or more visible light cameras 818, infrared/depth cameras 820, and microphones 822. The NUI interface system 812 may be configured to process the low-level input from the sensory components to yield an actionable, high-level input to the computing system 800. Such actions may generate corresponding text-based user input or other high-level commands, which may be received in the computing system 800. In some embodiments, NUI interface system and the sensory componentry (e.g., visible light camera(s) 818, infrared/depth camera(s) 820, and microphone(s) 822) may be integrated together in a shared housing. In other embodiments, the NUI interface system may be integrated with the computing system and may receive low-level input from peripheral sensory components.

When included, communication subsystem 810 may be configured to communicatively couple computing system 800 with one or more other computing devices. Communication subsystem 810 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 800 to send and/or receive messages to and/or from other devices via a network such as the Internet.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A method of reducing camera interference with one or more proximate infrared devices, each proximate infrared device having a housing separate from the camera, the method comprising:
receiving from a camera that emits infrared light an infrared image of a scene;
recognizing from the infrared image an interference condition likely to degrade infrared performance of the one or more proximate infrared devices having housings separate from the camera; and
responsive to recognizing the interference condition, outputting an instruction to mitigate the interference condition.

2. The method of claim 1, wherein each pixel of the infrared image is associated with a depth value, and wherein the interference condition includes a greater-than-threshold number of pixels of the infrared image having a depth value less than a threshold depth value.

3. The method of claim 1, wherein each pixel of the infrared image is associated with a brightness value, and wherein the interference condition includes a greater-than-threshold number of pixels of the infrared image having a brightness value greater than a threshold brightness value.

4. The method of claim 1, wherein the interference condition includes an average brightness of the infrared image being greater than a threshold brightness.

5. The method of claim 1, wherein the interference condition includes a scalar representative of a function of depth and brightness of the infrared image being greater than a threshold value.

6. The method of claim 1, wherein the instruction to mitigate the interference condition includes one or more of adjusting an infrared laser power of infrared light emitted by the camera, adjusting an illumination wave form of infrared light emitted by the camera, adjusting a frame rate of infrared images captured by the camera, and adjusting an illumination profile of infrared light emitted by the camera.

7. The method of claim 1, wherein the instruction to mitigate the interference condition includes one or more of displaying a notification indicating that placement of the camera is causing the interference condition, presenting an audio notification indicating that placement of the camera is causing the interference condition, and providing audio or visual prompts that instruct how to adjust placement of the camera or an object in the scene to mitigate the interference condition.

8. The method of claim 1, wherein the instruction to mitigate the interference condition includes displaying an image of the scene, the image including highlighting of specific objects in the scene determined to be causing the interference condition.

9. The method of claim 1, wherein the camera is a time-of-flight depth camera, and each pixel of the infrared image is associated with a depth value.

10. The method of claim 1, wherein the camera is configured to switch between operation in a time-of-flight depth mode and a structured-light depth mode, and wherein the instruction to mitigate the interference condition includes switching an operating mode of the camera between the time-of-flight depth mode and the structured light depth mode.

11. A storage machine holding instructions executable by a logic machine to:
receive from a camera that emits depth sensing light an image of a scene;
recognize from the image an environmental condition likely to degrade performance of the camera and one or more specific real-world objects in the scene responsible for causing the environmental condition; and
responsive to recognizing the environmental condition, output an instruction to mitigate the environmental condition, wherein the instruction to mitigate the environmental condition includes displaying an image of the scene, the image including highlighting of the one or more specific real-world objects in the scene determined to be causing the environmental condition.

12. The storage machine of claim 11, wherein each pixel of the image is associated with a depth value, and wherein the environmental condition includes a greater-than-threshold number of pixels of the image having a depth value less than a threshold value.

13. The storage machine of claim 11, wherein each pixel of the image is associated with a brightness value, and wherein the environmental condition includes a greater-than threshold number of pixels of the infrared image having a brightness value greater than a threshold value.

14. The storage machine of claim 11, wherein the environmental condition includes an average brightness of the image being greater than a threshold brightness.

15. The storage machine of claim 11, wherein the instruction to mitigate the environmental condition includes one or more of adjusting a laser power of light emitted by the camera, adjusting an illumination wave form of light emitted by the camera, adjusting a frame rate of images captured by the camera, and adjusting an illumination profile of light emitted by the camera.

16. The storage machine of claim 11, wherein the instruction to mitigate the environmental condition includes one or more of displaying a notification indicating that placement of the camera is causing the environmental condition, presenting an audio notification indicating that placement of the camera is causing the environmental condition, and providing audio or visual prompts that instruct how to adjust placement of the camera or an object in the scene to mitigate the environmental condition.

17. A device comprising:
a logic machine;
a storage machine holding instructions executable by the logic machine to:
receive from a camera that emits infrared light an infrared image of a scene;
recognizing from the infrared image an interference condition likely to degrade infrared performance of the one or more proximate infrared devices, each proximate infrared device having a housing separate from the camera; and
responsive to recognizing the interference condition, outputting an instruction to mitigate the interference condition.

18. The device of claim 17, wherein the instruction to mitigate the interference condition includes one or more of adjusting an infrared laser power of infrared light emitted by the camera, adjusting an illumination wave form of infrared light emitted by the camera, adjusting a frame rate of infrared images captured by the camera, and adjusting an illumination profile of infrared light emitted by the camera.

19. The device of claim 17, wherein the instruction to mitigate the interference condition includes one or more of displaying a notification indicating that placement of the camera is causing the interference condition, presenting an audio notification indicating that placement of the camera is causing the interference condition, and providing audio or visual prompts that instruct how to adjust placement of the camera or an object in the scene to mitigate the interference condition.

20. The device of claim 17, wherein recognizing the interference condition includes recognizing from the image one or more specific real-world objects in the scene responsible for causing the interference condition, and wherein outputting the instruction to mitigate the interference condition includes displaying an image of the scene, the image including highlighting of the one or more specific real-world objects in the scene determined to be causing the interference condition.

\* \* \* \* \*